United States Patent [19]
Dragisic

[11] 4,084,310
[45] Apr. 18, 1978

[54] APPARATUS FOR STRIPPING AND POSITIONING AN INSULATION CONDUCTOR

[75] Inventor: Joseph Dragisic, Cicero, Ill.

[73] Assignee: Bunker Ramo Corporation, Oak Brook, Ill.

[21] Appl. No.: 771,105

[22] Filed: Feb. 23, 1977

[51] Int. Cl.$^2$ ............................................. H02B 1/12
[52] U.S. Cl. ................................ 29/564.4; 81/9.5 A; 81/9.51
[58] Field of Search ............... 81/9.5 R, 9.5 A, 9.5 B, 81/9.5 C, 9.51; 29/564.4

[56] References Cited
U.S. PATENT DOCUMENTS

| | | | |
|---|---|---|---|
| 1,666,277 | 4/1928 | White | 81/9.51 |
| 2,285,167 | 4/1942 | Montgomery | 81/9.51 |
| 2,563,911 | 8/1951 | Beck | 81/9.51 |
| 3,176,550 | 4/1965 | Marcotte | 81/9.5 A |
| 3,588,984 | 6/1971 | Van Dekerkhof | 81/9.51 |
| 3,913,426 | 10/1975 | Blaha | 81/9.51 |

Primary Examiner—James L. Jones, Jr.
Assistant Examiner—Nicholas P. Godici
Attorney, Agent, or Firm—William Lohff; F. M. Arbuckle

[57] ABSTRACT

An apparatus is disclosed for stripping the insulation from the end of an insulated conductor and positioning the thus stripped conductor for termination. The apparatus includes two support members each carrying an insulation cutting knife and means for gripping the conductor, first cam means to actuate one of the support members from an open position to a closed, insulation-piercing and conductor-gripping position, second cam means to displace the conductor along its longitudinal axis to thereby strip the insulation from the end thereof, means for adjusting the movable support member to accommodate conductors of various diameters, means for adjusting the displacement of the stripped conductor to properly position for the termination operation, and means to actuate the first and second cam means in a predetermined operation sequence.

8 Claims, 9 Drawing Figures 4,084,310

APPARATUS FOR STRIPPING AND POSITIONING AN INSULATION CONDUCTOR

BACKGROUND OF THE INVENTION

The present invention relates generally to apparatus for dressing or preparing insulated conductors for termination with an electrical contact and, more particularly, to an apparatus for stripping the insulation from the end of an insulated conductor and positioning the stripped conductor for termination with a crimp-type contact.

A variety of prior art tools and machines have been developed for stripping insulation from a conductor in preparation for terminating the conductor with an electric contact. Prior art devices are also known which subsequently crimp an electrical contact to the stripped conductor in an automatic or semi-automatic operation. While some of these prior art apparatus have met with success, they suffer from several disadvantages which have limited their acceptance and usefulness. Most of the prior art machines are mechanically complex and are expensive to manufacture and maintain. In addition, some apparatus employ pneumatic power and control systems which further complicate the construction and operation of the device and which oftentimes require frequent adjustment. Due to the complexity of most of the prior art machines, it is both difficult and time consuming to adjust the equipment, if it is capable of adjustment, to accept conductors of varying diameters and contacts of different dimensions.

SUMMARY OF THE INVENTION

Accordingly, the present invention is directed to a conductor stripping and positioning apparatus which overcomes the problems associated with the prior art devices. The apparatus is relatively simple in structure and is entirely mechanical in operation. Moreover, the invention provides adjustment means to accommodate conductors of varying diameters and contacts of different dimensions, these adjustment means being readily accessible to greatly facilitate the use and operation of the apparatus. By virtue of the invention's simplicity, the costs of manufacture are reduced and its reliability and performance are enhanced.

The apparatus of the present invention generally comprises two support members each of which carries an insulation-cutting knife and means to grip the conductor; a first cam means which moves one of the support members from an open conductor-receiving position to a closed insulation-piercing and conductor-gripping position; a second cam means which acts to displace the conductor along its longitudinal axis to thereby strip the insulation from the end of the conductor and position it for the termination operation; means for adjusting the moveable support member support member to accommodate conductors of varying diameters; means for adjusting the displacement of the stripped conductor to properly position it for the termination operation; and means to actuate the first and second cam means in a predetermined operating sequence.

BRIEF DESCRIPTION OF THE DRAWINGS

The novel features which are believed to be characteristic of the present invention are set forth with particularity in the appended claims. The invention, itself, however, together with further objects and attendant advantages thereof will be more readily understood by reference to the following detailed description of the invention taken in connection with the accompanying drawings in which:

DETAILED DESCRIPTION OF THE INVENTION

Figure 1:
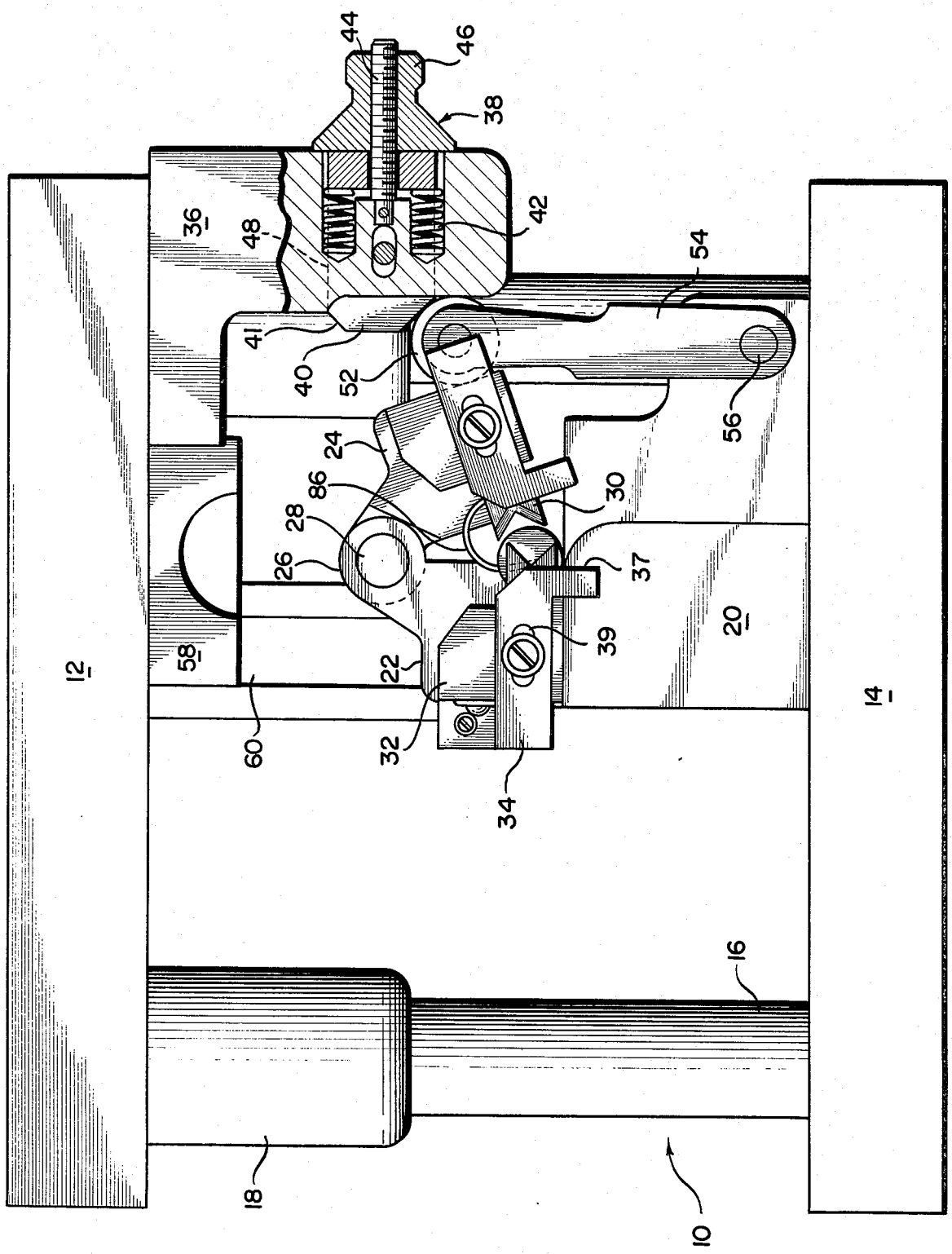
FIG. 1 is a front elevation illustrating the apparatus of the present invention in the initial station of the operating cycle and showing in cross-section one of the adjustment mechanisms of the preferred embodiment.

Referring now to the drawings, and particularly to FIG. 1, the apparatus of the present invention, designated generally as 10, is illustrated in the initial, conductor-receiving station of its operating cycle. The apparatus 10 includes upper and lower press plates 12 and 14 respectively, which are typical components of a conventional press. The lower press plate 14 supports a pair of guide posts 16 over which the collars 18 of the upper press plate 12 travel during the operating cycle of the apparatus.

Lower press plate 14 also supports a base 20 on which a stationary support member 22 is mounted. Support member 24 is, in turn, pivotally mounted to stationary support member 22 by means of hinge 26 and hinge pin 28. The support member 24 is biased toward the open position by means of a torsion spring 29 (see FIGS. 7 and 8). Each of the support members carries an insulation-piercing knife 30 and means for gripping the insulated conductor. Each gripping means includes an arm 32 which supports a grip member 34 at its free forward end.

Depending from upper press plate 12 is a cam retainer 36 to which the support member cam means 38 is mounted. The cam means 38 includes a cam member 40, compression springs 42, a threaded post 44 and adjustment nut 46. The cam member 40 is slidably mounted in a slot 48 milled in the retainer 36 and extends from the inside surface 50 of retainer 36 a distance set by rotation of nut 46. The support member camming means 38 also includes a cam roller 52 which is supported on an arm 54 pivotally secured to the base 20 by pin 56. Also depending from upper press plate 12 is a second cam retainer 58 to which a second camming means 60 is mounted.

The insulation-piercing knives 30 are mounted in milled slots in the front faces of support members 22 and 24 by any suitable means such as screws 31. Each knife 30 includes an elongated slot 33 which enables its individual adjustment when necessary or desired. The cutting edges 35 of the knives are V-shaped to penetrate a maximum amount of insulation without damaging the conductor core.

Figure 2:
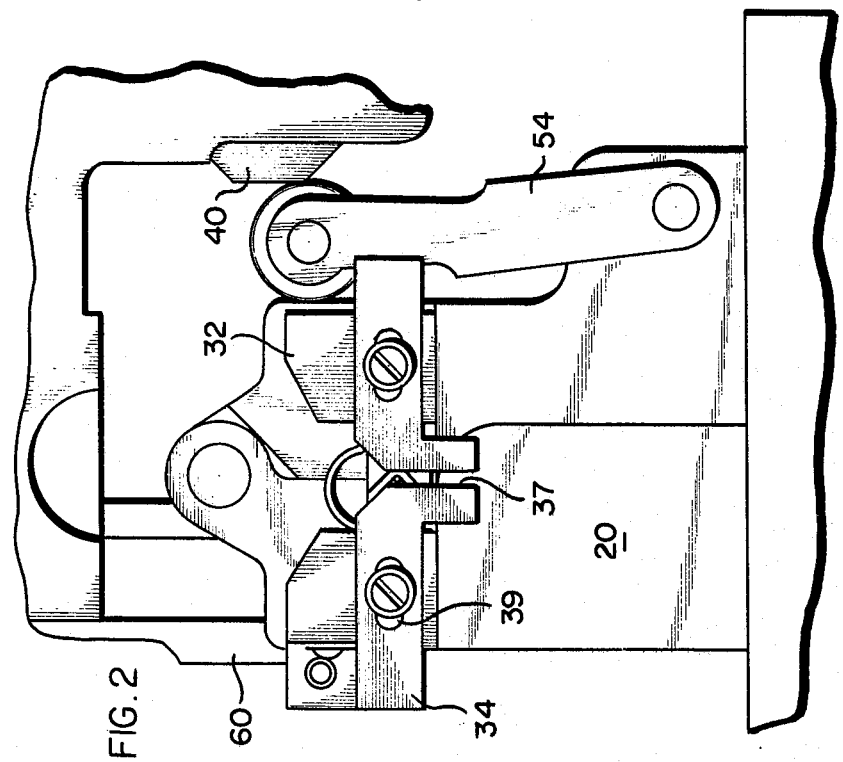
FIG. 2 is a partial elevation similar to FIG. 1 with the apparatus in an intermediate station of the operation cycle.
Figure 4:
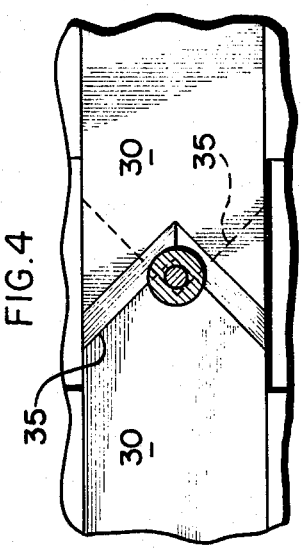
FIG. 4 is an enlarged view illustrating the cutting blades of the apparatus closed on an insulated conductor.
Figure 5:
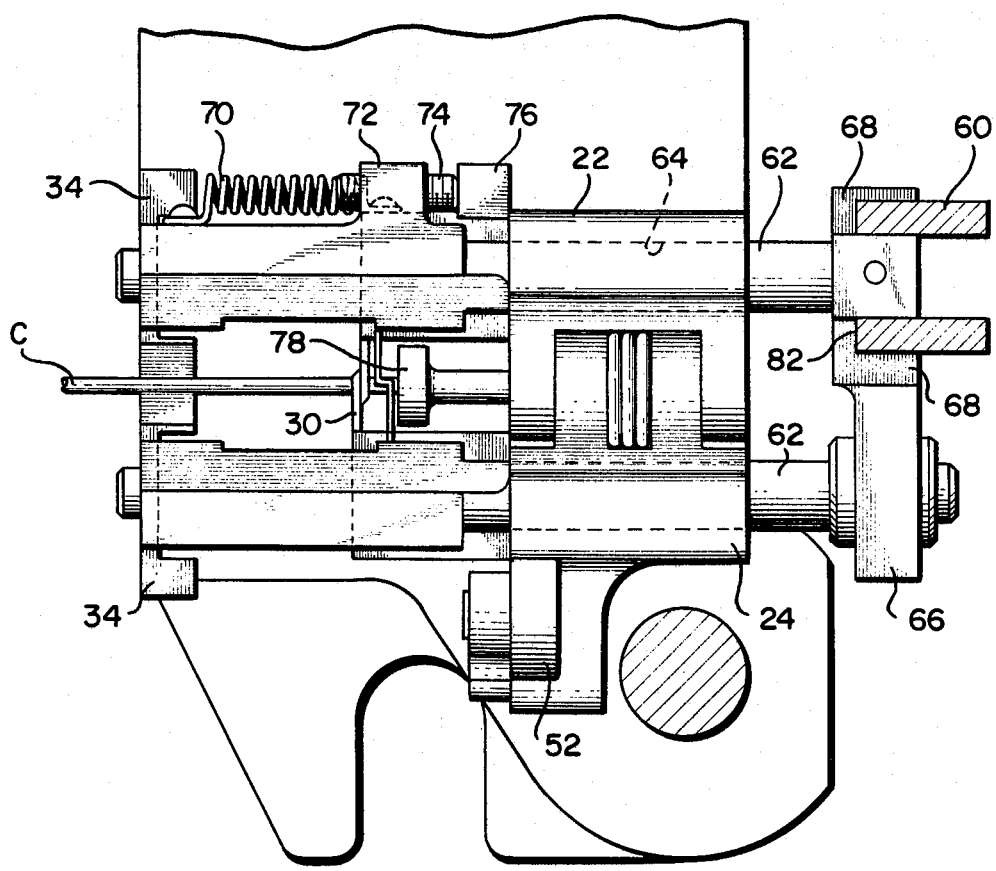
FIG. 5 is a plan view of the apparatus with the upper press assembly removed, showing the apparatus in the intermediate station as illustrated in FIG. 2.
Figure 6:
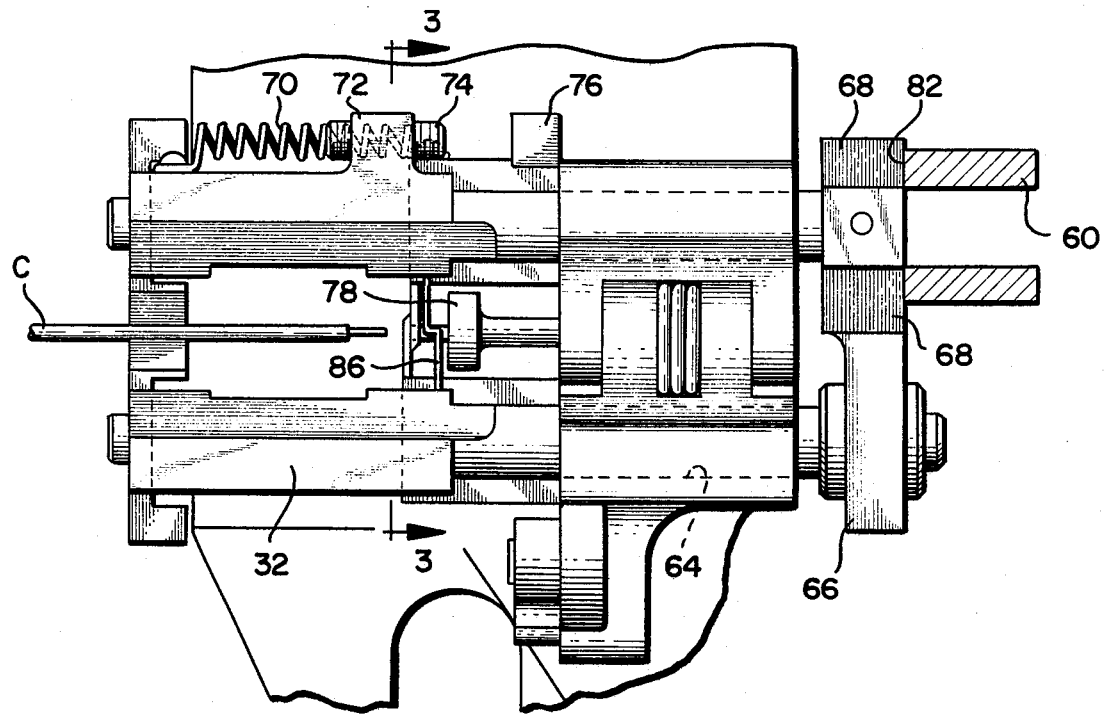
FIG. 6 is a view similar to FIG. 5 showing the apparatus in the final station of the operating cycle with the conductor having been stripped and positioned for crimping.

FIGS. 2, 5 and 6 most clearly illustrate the construction and arrangement of the gripping means employed in the present invention. As mentioned above, the grip members 34 are mounted to the forward extremities of the arms 32.

The grip members 34 include serrated engaging surfaces 37 to positively hold the insulated conductor therebetween. In addition, the grip members 34 are provided with elongated slots 39 which allow the grip members to be individually adjusted when necessary.

Figure 9:
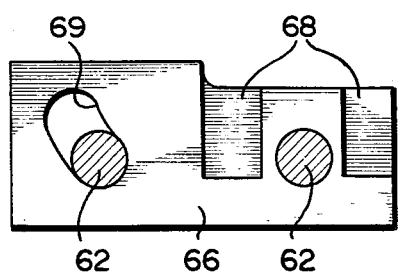
FIG. 9 is a partial view in cross-section along line 9—9 of FIG. 7.

Each arm 32 of the gripping means includes a rearwardly extending support shaft 62 which is journaled in a longitudinal bore 64 of the supporting members 22 and 24. The arms 32 are fixed and aligned longitudinally with respect to one another by means of a yoke 66 which is fixedly secured to the rear extremity of each support shaft 62. The yoke 66 includes a pair of inclined surfaces 68 which coact with camming means 60 to displace the gripping means along the longitudinal axis of the conductor C as the camming means 60 moves downward during the operating cycle. In order to accommodate the rotation of support arm 24 about hinge 26, the yoke 66 includes an arcuate slot 69, as is shown in FIG. 9.

The gripping means is biased rearwardly by means of an extension spring 70 which is connected at one end to the arm 32 journaled in stationary support member 22, and at its other end to base 20. The arm 32 journaled in support member 22 also includes a collar 72 extending laterally therefrom and having a threaded bore which accommodates set screw 74. The collar 72 and set screw 74 are aligned with a stop block 76 which is secured in fixed position to support member 22. Accordingly, by rotation of set screw 72, the position of the gripping means may be adjusted relative to camming means 60.

The apparatus of the present invention also includes an adjustable stop member 78 which comprises a generally circular head fixed to the end of an elongated stem. The stem is slidably disposed within an elongated bore (not shown) in support member 22 and may be fixed in any given position by means of a set screw. The stop 78 serves as an indexing means to properly position the insulated conductor C prior to beginning the operating cycle of the apparatus. Of course, the position of the stop 78 relative to the knives 30 determines the length of insulation to be stripped from the end of the conductor. In addition to the adjustment of stop member 78, spacers or shims may be employed when mounting the knives 30 to the front faces of support members 22 and 24, thereby providing further means of adjusting the amount of insulation stripped from the conductor.

Figure 7:
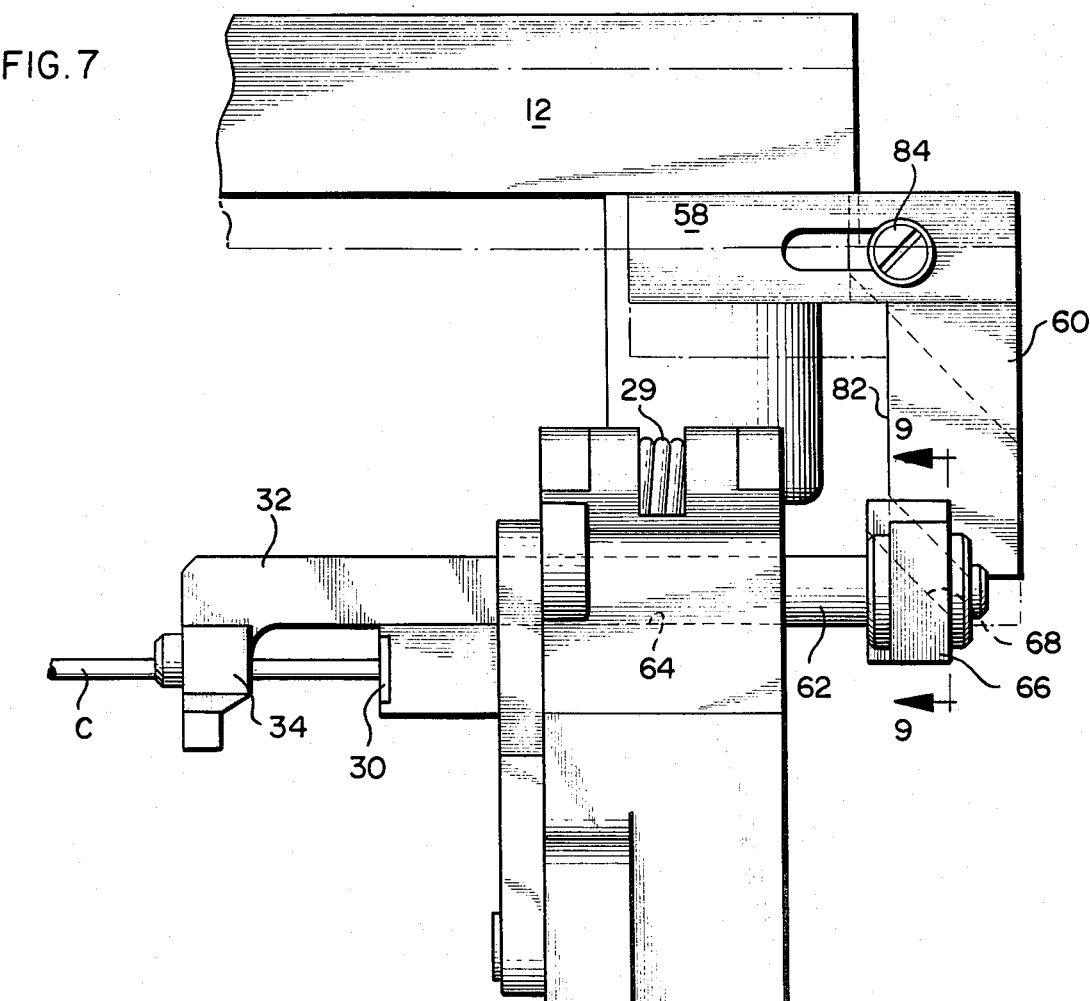
FIG. 7 is a side elevation of the apparatus with the support member cam assembly removed, and showing the apparatus in the intermediate station as illustrated in FIGS. 2 and 5.
Figure 8:
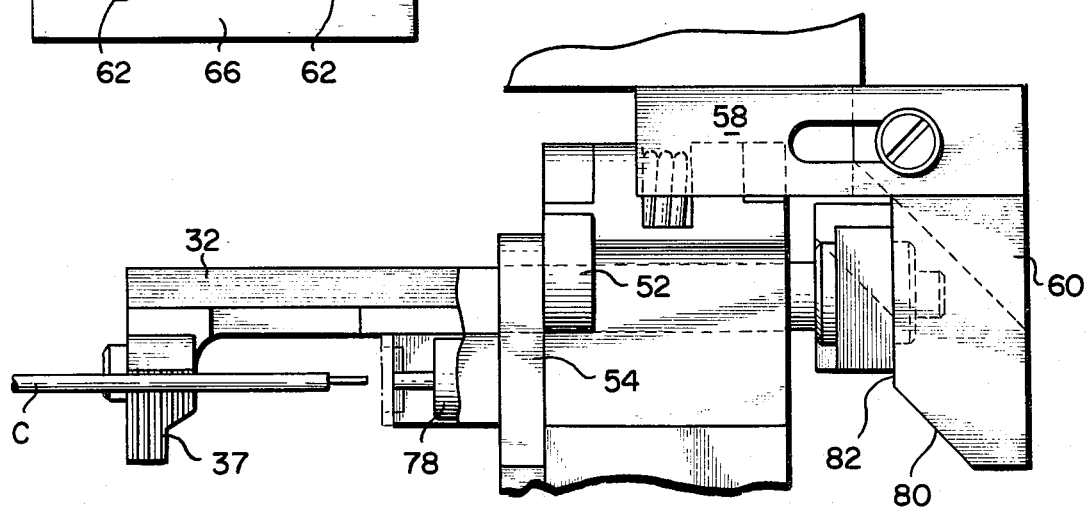
FIG. 8 is a partial side elevation similar to FIG. 7 showing the apparatus in the final station of the operating cycle as illustrated in FIGS. 3 and 6.

As can be seen most clearly in FIGS. 7 and 8, the camming means 60 depends from the retainer 58 at the rear edge of upper plate 12 and includes camming surfaces 80 which coact with incline surfaces 68 on yoke 66. Of course, the final position of the gripping means as illustrated in FIG. 8 will depend upon the position of the inside lateral surface 82 of camming means 60. Of course, the position of surface 82 may be adjusted by moving the entire camming means 60 in retainer 58 and fixing the camming means 60 with a suitable fastening device such as screw 84.

The apparatus of the present invention also includes means to eject the stripped insulation from the knife blades 30 after the stripping operation has been effected. In accordance with the preferred embodiment of the invention, and as illustrated in FIGS. 1 and 6, the ejector 86 comprises a semi-circular loop of spring wire which extends into the space between stop member 78 and knives 30 and moves across the longitudinal axis of the conductor as the support member 24 pivots outwardly to the open position.

Figure 3:
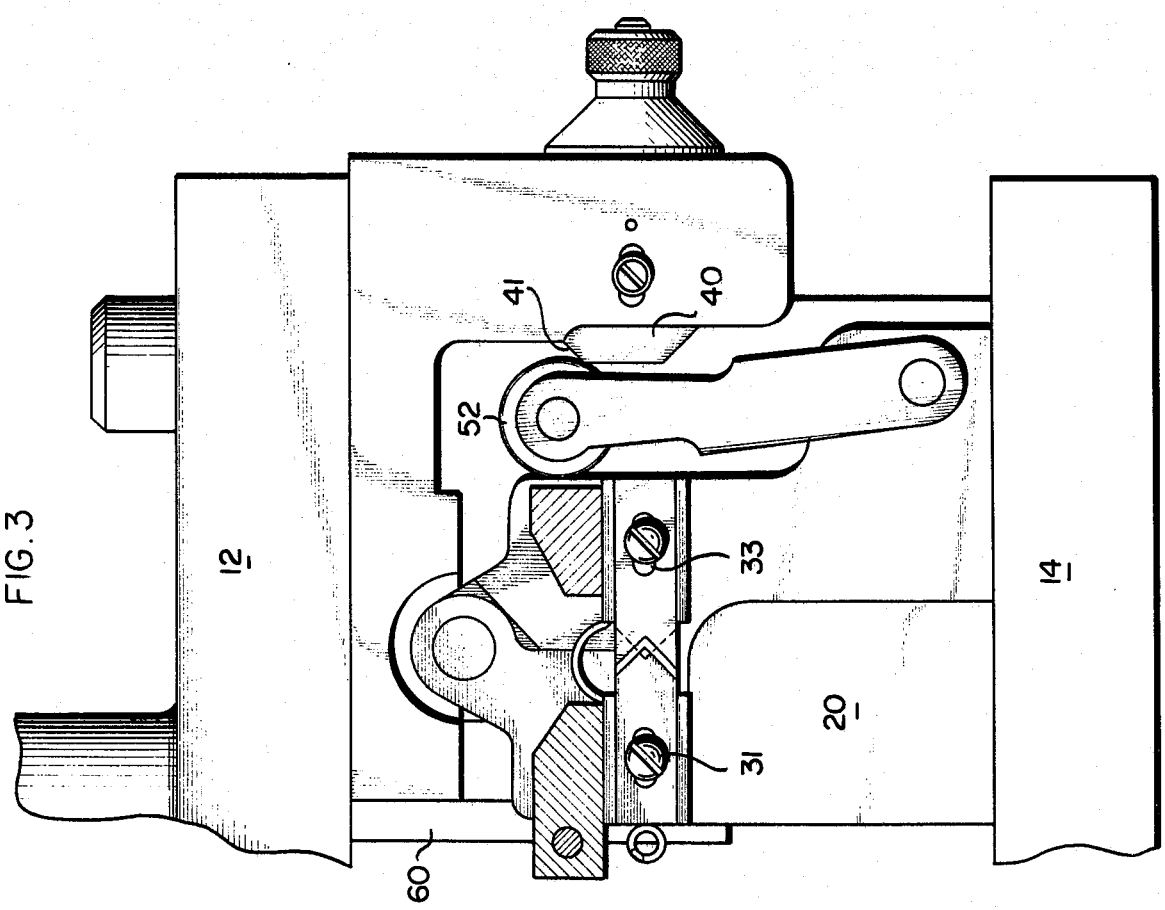
FIG. 3 is a cross-section view taken along line 3—3 of FIG. 6 and illustrating the apparatus in the final station in the operating cycle.

In the operation of the present invention the camming means 60 is initially set to establish the final position of the grip members 34, and the camming means 38 is adjusted to accommodate an insulated conductor having a specified diameter. The stop member 78 is also positioned relative to the knives 30 to strip the desired length of insulation from the conductor. Finally, the set screw 74 is adjusted to establish the initial position of the gripping members 34 to set the length of travel of the displacement stroke and to accurately position the stripped conductor for the termination operation. Having made these adjustments, the conductor is inserted into the front of the apparatus until it abuts the front face of stop 78. The apparatus, of course, is in the initial station of the operating cycle, with the support member 24 in the open, conductor-receiving position. With the conductor in proper position, the upper press plate 12 is lowered, thereby initially engaging camming means 38 with support member 24. As the camming means 38 is lowered the cam member 40 engages cam roller 52 which, in turn, bears against the outer surface of support member 24, moving it to the closed position. At this point the apparatus is at an intermediate station of the operating cycle as illustrated in FIG. 2, with the knives 30 having pierced the insulation of the conductor and the surfaces 37 of grip members 34 engaging and holding the conductor. As the press plate 12 continues to drop, the cam surface 80 of camming means 60 engages the inclined surfaces 68 of yoke 66, thereby driving the gripping means forward and pulling the conductor C, held between grip members 34, out from between the stationary knives 30. The press plate 12 then drops to its lowermost point where the cam roller 52 reaches the upper inclined surface 41 of the cam member 40. At this point the torsion spring 29 forces the support member 24 away from support member 22, thereby releasing slightly the conductor C from between surfaces 37. This is the final station of the operating cycle as illustrated in FIGS. 3 and 6, during which station the crimping tool or other termination apparatus engages the stripped conductor and connects it to the electrical contact in the desired manner. Subsequently, the upper press plate 12 returns to its initial, raised position, allowing the support member 24 to move to its open position after which another operating cycle may begin.

Of course, the present invention finds its most suitable and expeditious application when used in conjunction with a crimping machine wherein crimp type contacts are joined with the stripped end of the insulated conductor. Typically, these apparatus include a press which forces the stripped wire and open barrel of the contact into a crimping die which deforms the barrel and closes it about the conductor core. It is also customary that the contacts be supplied to this crimping operation in a continuous strip, each of the contacts being severed from the strip during the crimping operation. It will be apparent to those skilled in the art that the crimping press may be operatively connected to the press employed with the present invention and arranged to drop between the gripper arms 32 to engage the stripped end of the conductor C and to force it and an aligned contact into a crimping die. In a manner well known in the art, an unterminated contact may be positioned for the crimping operation concurrently with the initiation of the stripping and positioning operating cycle.

It will be further appreciated by those skilled in the art that the present invention provides an apparatus which may be easily adjusted to accommodate insulated conductors having different diameters and contacts having different dimensions. The present invention is, therefore, particularly advantageous for use in crimping machines wherein different sized contacts are regularly and frequently used. The adjustment mechanism for the support member camming means is easily accessible, as is the adjustment mechanism employed to set the length of travel for the displacement stroke. Each adjustment can be made in a few moments and without disassembly of the apparatus.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for stripping insulation from the end of an insulated conductor and for positioning the stripped conductor for a termination operation, said apparatus comprising:
   two support members each carrying an insulation-piercing knife and a conductor-gripping means, one said member being stationary and the other member being pivotally mounted to move between an open position wherein said knives and gripping means are spaced apart and a closed position wherein said knives pierce the insulation of the conductor and the gripping means engage and hold the conductor therebetween;
   first cam means coacting with said other member to shift said other member from said open position to said closed position;
   second cam means coacting with said gripping means to displace said gripping means along the longitudinal axis of said conductor;
   means cooperating with said first cam means for adjusting the closed position of said other member to accommodate conductors of varying diameters;
   means cooperating with said gripping means for adjusting the displacement of said gripping means to properly position the conductor for the termination operation; and
   means for actuating both said first and second cam means in a predetermined operating sequence.

2. The apparatus of claim 1 wherein said support members each includes a longitudinal bore and said gripping means each includes a support shaft slidably disposed within one of said bores, said support members being stationary relative to the longitudinal axis of the conductor.

3. The apparatus of claim 1 wherein said first cam means is slidably mounted to said actuating means and is adjustable in a direction generally transverse to the longitudinal axis of the conductor.

4. The apparatus of claim 1 wherein said second cam means is adjustable to establish the final position of said gripping means in the operating cycle of said apparatus.

5. The apparatus of claim 1 wherein said displacement adjusting means includes means to vary the initial position of said gripping means relative to the longitudinal axis of the conductor.

6. The apparatus of claim 1 wherein said first cam means actuates both said insulation-piercing knives and said gripping means, and said second cam means actuates only the displacement of said gripping means.

7. An apparatus for stripping insulation from the end of an insulated conductor and positioning the stripped conductor for a termination operation, comprising:
   a base;
   a stationary support member mounted on said base;
   a second support member pivotally mounted to said stationary support member and movable between open and closed position;
   a pair of insulation-piercing knives, each one mounted on a respective support member;
   a pair of gripping arms, each one slidably mounted on a respective support member and including a conductor engaging grip member;
   said knives and said grip members being spaced apart when said second support member is in the open position, and said knives piercing the insulation of the conductor and said grip members holding the conductor when said second support member is in the closed position;
   first cam means for shifting said second support member from the open position to the closed position;
   second cam means for displacing said gripping arms along the longitudinal axis of said conductor while said support members remain stationary;
   means cooperating with said first cam means for adjusting the closed position of said second support member to accommodate conductors of varying diameters;
   means cooperating with said gripping arms for adjusting the displacement of said gripping arms to properly position the conductor for the termination operation; and
   means for actuating both said first and second cam means in a predetermined operating sequence.

8. In a crimping machine wherein insulation is stripped from the end of an insulated conductor and an electric contact is thereafter crimped to the stripped conductor, the improvement comprising:
   two support members each carrying an insulation-piercing knife and a conductor-gripping means, one said member being stationary and the other member being pivotally mounted to move between an open position wherein said knives and gripping means are spaced apart and a closed position wherein said knives pierce the insulation of the conductor and the gripping means engage and hold the conductor therebetween;
   first cam means coacting with said other member to shift said other member from said open position to said closed position;
   second cam means coacting with said gripping means to displace said gripping means along the longitudinal axis of said conductor;

means cooperating with said first cam means for adjusting the closed position of said other member to accommodate conductors of varying diameters;
means cooperating with said gripping means for adjusting the displacement of said gripping means to properly position the conductor for the termination operation; and
means for actuating both said first and second cam means in a predetermined operating sequence.

* * * * *